US008191126B2

(12) United States Patent
Raghavan

(10) Patent No.: US 8,191,126 B2
(45) Date of Patent: May 29, 2012

(54) METHODS AND DEVICES FOR PATTERN-BASED USER AUTHENTICATION

(75) Inventor: Serugudi Venkata Raghavan, Tamilnadu (IN)

(73) Assignee: Indian Institute of Technology Madras (IN)

( * ) Notice: Subject to any disclaimer, the term of this patent is extended or adjusted under 35 U.S.C. 154(b) by 404 days.

(21) Appl. No.: 12/434,728

(22) Filed: May 4, 2009

(65) Prior Publication Data

US 2010/0281526 A1 Nov. 4, 2010

(51) Int. Cl.
*H04L 29/06* (2006.01)
(52) U.S. Cl. .................. 726/7
(58) Field of Classification Search .................. 726/7
See application file for complete search history.

(56) References Cited

U.S. PATENT DOCUMENTS

| | | | | |
|---|---|---|---|---|
| 5,465,084 A * | 11/1995 | Cottrell | ........................ | 340/5.27 |
| 6,118,872 A * | 9/2000 | Kashima et al. | .............. | 380/205 |
| 6,209,104 B1 * | 3/2001 | Jalili | ............................... | 726/18 |
| 6,246,769 B1 * | 6/2001 | Kohut | ............................. | 380/45 |
| 2005/0160297 A1 * | 7/2005 | Ogawa | .......................... | 713/202 |
| 2007/0074119 A1 * | 3/2007 | Komine et al. | .............. | 715/743 |
| 2007/0226784 A1 * | 9/2007 | Ueda et al. | ........................ | 726/5 |
| 2008/0141362 A1 * | 6/2008 | Torres et al. | ..................... | 726/18 |
| 2008/0141363 A1 * | 6/2008 | White | ............................. | 726/18 |
| 2009/0083850 A1 * | 3/2009 | Fadell et al. | ..................... | 726/19 |
| 2009/0144554 A1 * | 6/2009 | Baker | ........................... | 713/183 |

OTHER PUBLICATIONS

RSA, The Security Division of EMC, RSA SecurID® authenticators, pp. 1-1, http://www.rsasecurity.com, printed Jul. 27, 2010.
Suo, X., et al., "Graphical Passwords: A Survey," In ACSAC, 21st Annual Computer Security Applications Conference (ACSAC'05), 2005, pp. 1-10.
Gilhooly, K., "Biometrics: Getting Back to Business," In Computerworld, May 9, 2005, printed Aug. 11, 2010.
Microsoft Security, "Create Strong Passwords," Microsoft Online Safety, pp. 1-2, http://www.microsoft.com/protect/yourself/password/create.mspx, printed Jul. 27, 2010.
Brainard, J., et al., "Fourth-Factor Authentication: Somebody You Know," In: Proceedings of the 13th ACM Conference on Computer and Communications Security, 2006, pp. 168-178.

(Continued)

*Primary Examiner* — Michael S McNally
(74) *Attorney, Agent, or Firm* — McDonnell Boehnen Hulbert & Berghoff LLP

(57) ABSTRACT

Methods, devices, and systems are presented that facilitate pattern-based user authentication. In a first embodiment, a user may request registration from an authentication server. The authentication server may provide at least one image to the user, wherein the image may comprise a matrix of cells. The user may choose a sequence of cells in the matrix as his or her secret, and may provide a userid and this secret to the authentication server. The authentication server may then validate and store the userid and/or secret. After this registration step, the user may request authentication from the authentication server. The authentication server may provide another image of a matrix of cells to the user. The user may then enter a sequence of symbols associated the sequence of cells that comprise his or her secret. The authentication server may compare the entered sequence of cells to the sequence of cells represented by the stored secret. If the two sequences match, then the user may be authenticated.

7 Claims, 11 Drawing Sheets

OTHER PUBLICATIONS

Shepard, R. N., "Recognition Memory for Words, Sentences and Pictures," Journal of Verbal Learning and Verbal Behavior, Feb. 1967, vol. 6, Issue 1, pp. 156-163.

Adams, A., et al., "Users Are Not the Enemy," Communications of the ACM, vol. 42, Issue 12, Dec. 1999, pp. 40-46.

Kumar, T.R., et al., "PassPattern System (PPS): A Pattern-Based User Authentication Scheme," Proceedings of the 7th international IFIP-TC6 networking conference on AdHoc and sensor networks, wireless networks, next generation Internet, May 6, 2008.

Jansen et al., "Picture Password: A Visual Login Technique for Mobile Device," NISTIR 7030, National Institute of Standards and Technology, Jul. 2003.

* cited by examiner

FIG. 1

METHODS AND DEVICES FOR PATTERN-BASED USER AUTHENTICATION

BACKGROUND

With the growth of the Internet, user authentication to computers and networks has become increasingly important. User authentication systems typically associate a user identifier (userid) and a password, and store these values in a mapping. Each time a user attempts to access a resource, an authentication system may require that the user enter his or her userid and password. The authentication system will typically grant the user access to the resource if the entered userid and password match the stored mapping. However, the authentication system will typically deny access to the resource if the entered userid and password do not match the stored mapping.

The strength of such a method of user authentication may be based to some extent on the length and randomness of the password. Generally speaking, the longer and more random the password, the harder the password will be to guess or to discover using an exhaustive search. Nonetheless, some users may pick passwords that are short and easy to remember. Often, it is relatively easy for a third party to discover a weak password of a user, either by guessing the password through trial and error, by using personal information about the user, or by an exhaustive search.

Alternative authentication schemes have been developed such as those based on biometrics, random passwords, and/or graphical passwords. Each of these mechanisms has its own advantages and disadvantages, and none provide an ideal solution. One of the main reasons why password-based authentication is still widely used is that upgrading or changing to technology that supports one of these alternative authentication schemes may entail significant changes to the infrastructure of an authentication system. These changes could be costly and complicated. Thus, it may be desirable to develop an authentication scheme that is easy and intuitive to use, robust against attacks, and works using existing hardware and software infrastructure.

SUMMARY

Methods and devices for pattern-based user authentication are presented. These methods and devices may utilize two distinct phases of authentication. In a registration phase, a user may obtain an account with an authentication system, and the authentication system may store, on behalf of the user, a userid and an associated secret. In an authentication phase, the authentication system may grant the user access to one or more resources if the user enters a userid and its associated secret.

Accordingly, in an embodiment of the registration phase, a user interacts with an authentication server to determine a userid and secret for the user. The authentication server, which may use a world wide web (WWW) based interface, provides two images to the user. Each image may contain a representation of a matrix, and each of the cells in the matrix may contain a randomly generated symbol. The symbols may be various types of printable characters, such as ASCII characters. Alternatively, the symbols may include images or other types of information.

The user may choose a secret by selecting a sequence of cells, and entering the symbols associated with the sequence from each matrix. The user then provides this first sequence of symbols and second sequence of symbols to the authentication server, along with a userid. The authentication server may then determine whether the first sequence of symbols and the second sequence of symbols represent the same respective sequence of cells in each matrix. If that is the case, then the authentication server may provide an indication of successful generation of the secret to the user. Furthermore, the authentication server may store a mapping between the userid and a representation of the sequence of cells in a database of such userid/secret mappings. This sequence of cells in the matrix may be considered to be the user's secret.

After such a registration, the authentication system may be used to authenticate the user when the user attempts to log into a system with his or her userid. Accordingly, in a second embodiment, the authentication system may receive a request for authentication from a user. In response to this request, the authentication server may provide to the user an image of a matrix. Each cell in the matrix may contain a randomly generated symbol, and these symbols may be various types of printable characters, such as ASCII characters. Alternatively, the symbols may include images or other types of information.

The user may enter their userid and a sequence of symbols, and provide this entered information to the authentication server. The authentication server may then compare the sequence of symbols to the image, to determine the sequence of cells in the matrix to which the sequence of symbols refer. If the userid and the sequence of cells match a userid/secret mapping in the database, the authentication server may authenticate the user, and may provide an indication of authentication success to the user. Additionally, the authentication server may also grant the user access to one or more resources that are protected by the authentication system. However, if the userid and the sequence of cells do not match a userid/secret mapping in the database, the authentication server may not authenticate the user.

The authentication server may be integrated into or accessible from another system. For example, the authentication server may be used in conjunction with a WWW based service, such as an e-commerce or social networking web site. The authentication server may also be used within an enterprise network, and thus may be used in conjunction with an email server or a document management system. Furthermore, the authentication server may be software that is arranged to operate on a personal computer (PC) or workstation, and may be the means through which a user logs on to the PC or workstation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 1 is an image of a matrix in accordance with an example embodiment;

DETAILED DESCRIPTION

Figure 2:
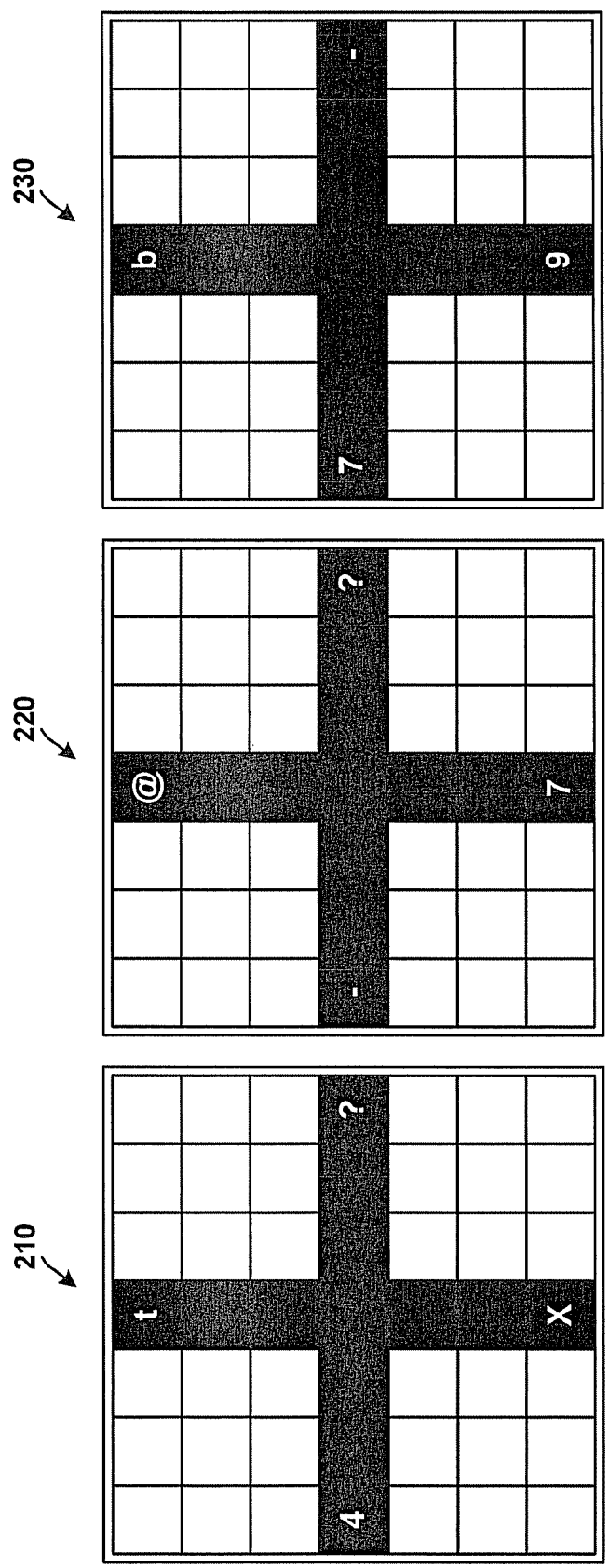
FIG. 2 is an image of several matrices in accordance with an example embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

For instance, it should be appreciated that for the embodiments described herein, the terms "random" or "randomly" shall refer to any realizable process of randomly generating events. Such processes shall include, but not be limited to, generating events without a deterministic pattern of occurrences. Additionally, these processes may be pseudo-random, thus resulting in a deterministic pattern of occurrences that exhibit some form of statistical randomness.

Moreover, any and all communication described herein may take place over a network, such as the Internet, some other public or private network. Accordingly, these communications made occur in plain text, or may be encrypted and/or authenticated in some fashion. For instance, some of the communication described herein may occur between a web browser and a web server. These communications may occur according to the hypertext transport protocol (HTTP) or HTTP over Transport Layer Security (HTTPS) messages. HTTP is defined in Internet Engineering Task Force (IETF) Request For Comments (RFC) 2616 and is incorporated by reference in its entirety herein. HTTPS is defined in IETF RFC 2818 and is also incorporated by reference in its entirety herein.

Thus, a user may partake in the methods described herein from any type of client device, including but not limited to a personal computer, mobile phone, or any other types of wired or wireless communication devices. In an example embodiment, the client device may support operating systems and platforms such as, but not limited to, WINDOWS MOBILE®, Java 2 Platform Micro Edition (J2ME®), BINARY RUNTIME ENVIRONMENT FOR WIRELESS® (BREW), PALM OS®, SYMBIAN®, APPLE® OS, and BLACKBERRY® OS.

Password-based authentication systems are the oldest and the most popular authentication schemes used in the modern world. However, users tend to choose simple, weak passwords that are easy to remember. Unfortunately, these simple passwords are also relatively easy to discover (or "break"). For example, a "hacker" may attempt to break a given user's password by trial and error. The hacker could choose common words or phrases from a dictionary, or choose information known about the given user (e.g., the given user's name, birthday, child's name, etc.). If the hacker has visual access to watch the user enter his or her password, the hacker might be able to determine the password in this manner. (Such a technique is often referred to as "shoulder-surfing.") Alternatively or additionally, with enough computing power, the hacker could attempt an exhaustive search of all possible passwords up to a given length to determine if any match the given user's password.

One way of addressing password weakness is to provide users with random passwords. However, random passwords are difficult for users to remember, and with contemporary computing power, even a randomly generated password of eight symbols in length may not withstand an exhaustive search attack for long. (For purposes of discussion, a "symbol" may be a printable character, such as an ASCII or UNICODE character, or some other type of representation of information.) Accordingly, some experts recommend that passwords should be 14 symbols or more, and also should appear to be random.

Given the increasing importance of e-commerce transactions, personal transactions, and financial transactions over the Internet and other types of networks, the security of the systems associated with these transactions is critical. For example, users may access their bank, credit card, and brokerage accounts over the Internet on a regular basis. Additionally, these same users may also use e-commerce sites, such as Amazon.com, iTunes, and eBay over the Internet. Furthermore, the same users may also use online email, blogging and/or social networking sites, such as Gmail, Wordpress, or Facebook.

Each of these accounts and/or sites may require that the user register with the site, and may grant the user a site-unique userid. The user may also be required to choose a password for the site. But if the user is allowed to choose a weak password that is readily guessed or otherwise discoverable by hackers, the user's financial and/or personal information may be readily available to those hackers.

Users may prefer to utilize the same password for more than one account, since passwords can be hard to remember, and any given user may have dozens of such accounts. This increases the detrimental impact of a weak password. For instance, if a hacker breaks the user's Facebook password, the hacker may be able to use that same password to access the user's bank account.

In response to these practical difficulties with traditional passwords, alternative authentication schemes have been developed. For example, biometric-based authentication systems attempt to verify a biological characteristic of the user, such as the user's fingerprint, voice, or vein patterns. A disadvantage with some biometric-based systems is that they are expensive and may require entirely new hardware and software. For example, if an e-commerce site changed its authentication system from password-based to fingerprint-based authentication, all of the site's users would have to install fingerprint readers on their computers, and the e-commerce site would have to maintain a registry of fingerprints. This kind of change in infrastructure may not be feasible for all users, and may also require that the users entrust the e-commerce site with their fingerprints. Not only would some users object to such a requirement, the cost of a security breach at the e-commerce site would be huge, as the fingerprints of all users could be exposed.

Another type of authentication system may require that the user know their userid and password, but also have access to an additional piece of information. For example, some authentication systems require that a user carry a physical device that displays a new pseudorandom code at fixed intervals. The pseudorandom number generator on the device may share a seed with a similar pseudorandom number generator on an associated authentication server, so that the authentication server can validate both the password and the pseudorandom code. However, this sort of system has the drawbacks of requiring that users carry a physical device, as well as the additional expense of providing these devices to users. Furthermore, if a physical device is lost, the security level of the system is reduced to that of the strength of the users' passwords.

Yet another type of authentication system displays a virtual keyboard on an output device. The user then enters his or her password using the virtual keyboard instead of a default input device. While this type of system is effective against keylogging attacks (where a hacker installs or causes to be installed a program on the user's computer than records all keystrokes), it is still subject to shoulder-surfing attacks.

Other types of authentication systems may use graphical passwords. In these systems, passwords take the form of a sequence of symbols or images. However, graphical passwords suffer from some of the same weaknesses as traditional passwords, in that users may choose a sequence that is easy to guess, and may use the same sequence across multiple accounts. Additionally, graphical passwords may require more storage than traditional passwords.

The embodiments herein may overcome one or more of the disadvantages of existing password systems. These embodiments are directed to challenge-response systems and are based on the premise that humans are good at identifying and remembering graphical patterns. Accordingly, instead of requiring that users remember sequence of symbols for a password, the users may remember a shape. These embodiments comprise at least two distinct phases, a registration phase, and an authentication phase. However, each phase may be combined with the other phase or conducted in isolation. Alternatively, more than two phases may be employed.

The registration phase may encompass the user requesting registration with an authentication server. Accordingly, the user may seek to establish an account on the authentication server, and the user may interact with the authentication server to determine the parameters of the account (e.g., userid and "secret"). The user may be physically present at the system or may be communicatively coupled to the system by, for example, a network such as the Internet. When a user requests registration to the system, the authentication system may provide to the user a matrix (which may also be referred to as a "pattern square") and may ask the user to choose a sequence of positions in the matrix. A matrix may be an n×n matrix of cells. Each cell in a matrix may be a symbol that represents a character, a picture or some other form of information.

These embodiments may also be used as a common authentication system for multiple services. For instance, today's banking, finance, e-commerce, email, blogging, and social networking sites typically use separate servers and require separate authentication phases for the same user. The embodiments herein may provide a single point of authentication, such as a universal authentication means that could be adopted by all of these services. Such a single point of authentication may be logically distributed across one or more physical servers.

Figure 1:
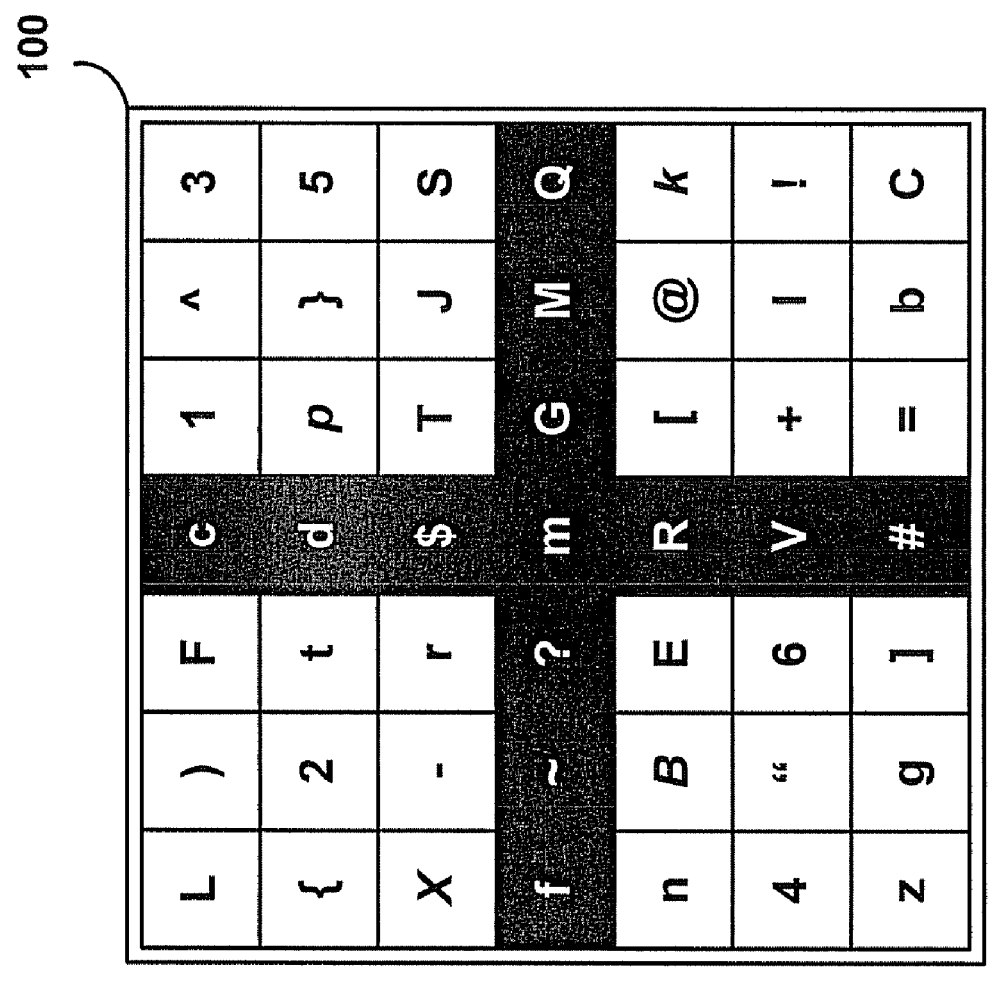

FIG. 1 is an example matrix 100. In this case, matrix 100 is 7×7 matrix, and accordingly contains 49 cells. Each cell contains a symbol. Each symbol appears in exactly one cell in the matrix. While matrix 100 contains symbols that are ASCII characters and italicized or stylized ASCII characters, matrix 100 could instead contain other types of symbols. For instance, each symbol in matrix 100 can be represented with different font, coding, compression, noise, or distortion. Furthermore, matrix 100 need not be a 7×7 matrix. Instead, matrix 100 could be an m×n matrix where m and n take on arbitrary integer values greater than zero. Thus, matrix 100 need not be in the shape of a square and instead could be in the shape of a rectangle. Moreover, matrix 100 need not be a matrix at all, and could take on an arbitrary shape instead.

Additionally, some or all cells of matrix 100 may be colored or shaded in such a way that it is easier for the user to visually distinguish individual cells or groups of cells. For example, matrix 100 displays most cells using black symbols on a white background. However, the center column and the center row of matrix 100 uses white symbols on a black background. In this way, different parts of a matrix may be easier for a user to distinguish.

The user may choose his or her sequence of positions on matrix 100 by entering the symbols in those positions. This sequence of positions then becomes the user's secret. (The user's secret may be thought of as a "password" for a matrix.) A secret so chosen may be stored on the authentication server and may be remembered by the user. In order to reduce the likelihood of the user mistyping the characters in the sequence of cells that they want, the authentication server may provide more than one different matrix to the user and may require that the user type characters in his or her chosen sequence of positions for each matrix. Thus, the authentication server can ensure that the user has entered symbols in the same sequence of positions for each matrix.

For instance, if a user seeking registration with the authentication server is presented with matrix 100, the user may choose her or her sequence of positions on the matrix to be the pattern of "top-most middle," "right-most middle," "bottom-most middle," and "left-most middle." Accordingly, the user may enter the sequence of symbols "cQ#f" via an input device.

Various types of input devices can be employed by the user to enter the sequence of symbols. For symbols that are ASCII characters, the user may enter the symbols with a keyboard, pointing device (such as a mouse), or a touchscreen. For symbols that are graphical in nature, the user may prefer to use a pointing device or touchscreen to enter the symbols. Alternatively, the user could use a keyboard to enter the graphical symbols, for instance typing a description of each symbol. (I.e., for a symbol that is a picture of a dog, the user could type the characters "dog" on the keyboard.) Furthermore, some cells may contain symbols that represent Completely Automated Public Turing test to tell Computers and Humans Apart (CAPTCHA) symbols, and the user may enter symbols, such as text strings, represented by these CAPTCHA symbols. CAPTCHA symbols may comprise one or more images that represent text, but the text may be distorted in some fashion. Ideally, the text in a CAPTCHA symbol is relatively easy for a human to ascertain, but difficult to ascertain computationally.

It should be understood that the embodiments herein do not rely on any specific types of input devices being used, and that methods, devices, and systems in accordance with these embodiments may be used with any type of input device now known or developed in the future.

Furthermore, the different types of symbols may be stored in dictionaries, and the authentication server may choose symbols from one or more of these dictionaries in order to generate a matrix. Thus, the authentication server may have access to dictionaries of ASCII character symbols, dictionaries of image symbols, dictionaries of CAPTCHA symbols, and other types of dictionaries.

After registration, the user may access resources associated with the authentication server by presenting these credentials (e.g., a userid and secret) during an authentication phase. The user may request access to the resources, and the authentication server may responsively provide the user with a display of a new matrix as a challenge. The user may be physically present at the system or may be communicatively coupled to the system by, for example, a network such as the Internet. This new matrix may be generated dynamically upon each user request. Hence, the characters in each cell of the new matrix may change for every such request.

FIG. 2 is an illustrative example of three different matrices, 210, 220, 230. For purposes of simplicity, the symbols in each cell of these matrices are obscured, with the exception of the symbols in the "top-most middle," right-most middle," "bottom-most middle," and "left-most middle" positions. Thus, if the user is presented with matrix 210, the user can enter the sequence of symbols "t?X4" to represent the user's secret, and to therefore prove to the authentication server that the user has access to the secret. Similarly, for matrix 220, the user can enter the sequence of symbols "@?7-" to authenticate himself or herself, and for matrix 230, the user can enter the sequence of symbols "b-97" to authenticate himself or herself. Of course, the matrix shapes, as well as the symbols shown in FIG. 2, are merely exemplary, and different types, configurations, and arrangements of matrices and symbols may be used instead.

One of the advantages of the embodiments herein is that the sequence of symbols that the user enters during each authentication phase may be different. Thus, a hacker who is "shoulder surfing" and watching the user enter sequences via typing symbols on a keyboard may observe the user entering a different sequence for each authentication phase. Therefore, it may be difficult for the hacker to determine the user's secret from this type of observation.

Figure 3A:
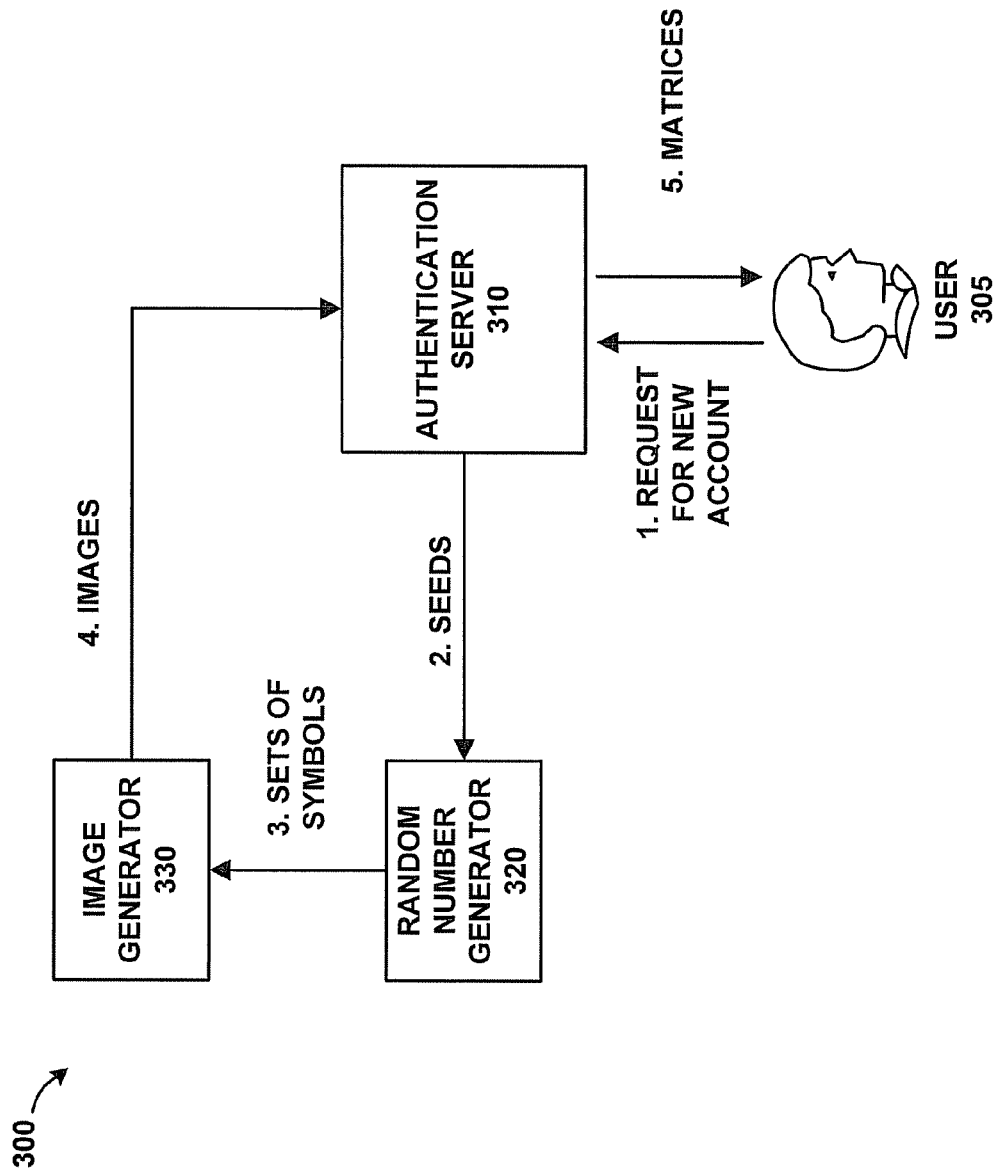
FIG. 3A is a registration message flow in accordance with an example embodiment.
Figure 3B:
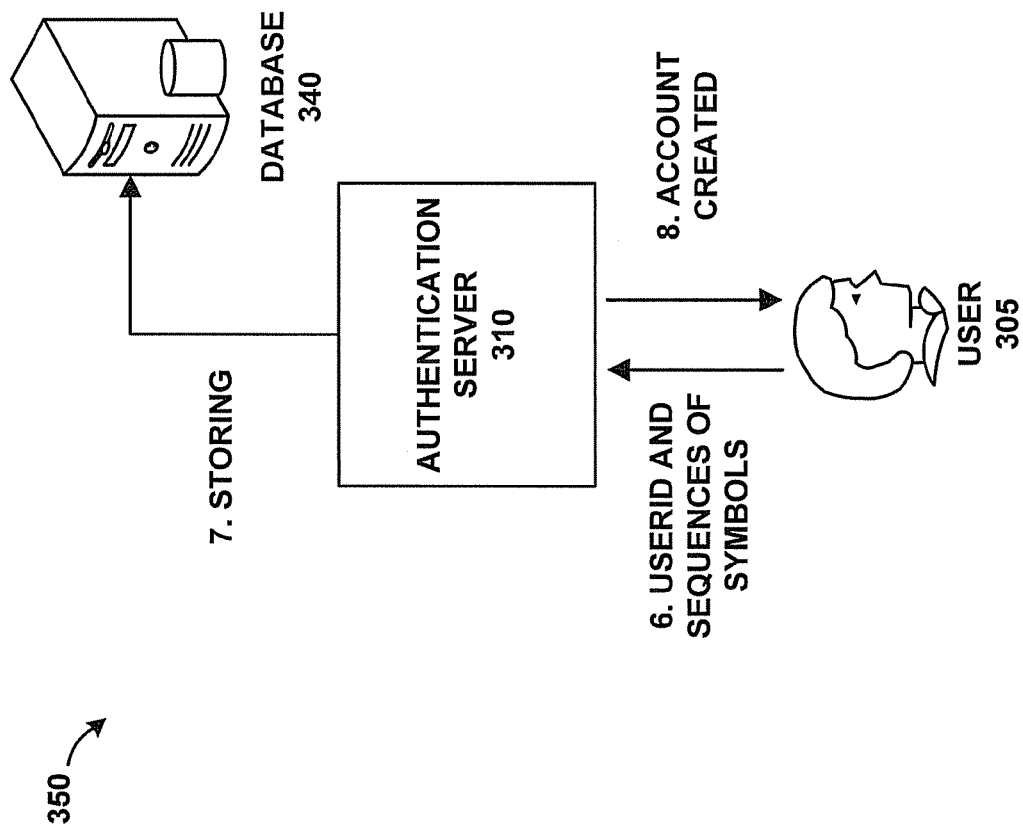
FIG. 3B is another registration message flow in accordance with an example embodiment.

FIGS. 3A, 3B, 4A, and 4B depict message flows of embodiments that further illustrate these registration and authentication phases. FIGS. 3A and 3B are block diagrams illustrating message flows 300 and 350 between various devices of a system that performs registration of user 305. At step 1 of message flow 300, user 305 requests a new account from authentication server 310. Presumably, but not necessarily, user 305 does not have an account with authentication server 310 prior to this step. At step 2 of message flow 300, authentication server 310 transmits one or more seeds to random number generator 320. These seeds may be temporary seeds used only for the current registration phase of user 305. These seeds may be generated based on a clock time maintained at authentication server 310, or by some other mechanism.

At step 3 of message flow 300, random number generator 320 transmits one or more sets of symbols to image generator 330. These symbols may be generated randomly, in conjunction with random number generator 320, based on the seeds. For instance, if authentication server transmits two seeds to random number generator 320, then random number generator 320 may randomly generate one set of symbols using each seed.

At step 4 of message flow 300, image generator 330 transmits one or more images to authentication server 310. Each of these images may represent matrices. The symbols used in such a matrix may be chosen from a set of symbols that image generator 330 received from random number generator 320. At step 5 of message flow 300, authentication server 310 may provide representations of these images to user 305.

Turning to FIG. 3B, at step 6 of message flow 350, user 305 may provide a userid and at least one sequence of symbols to authentication server 310. The userid may be chosen by the user. Each sequence of symbols may define an associated matrix of cells in one of the matrices provided to user 305 during step 5 of message flow 300. The sequence of cells may correspond to the cells in the matrix that contain the symbols provided by user 305. If user 305 provides more than one sequence of symbols, authentication server 310 may verify that each of these sequences of symbols corresponds to the same pattern of cells in each respective matrix. If this is not the case, authentication server 310 may reject the registration attempt by user 305. Such as rejection may include authentication server 310 providing an error message to user 305 indicating that the patterns associated with the sequences of symbols did not match, and/or allowing user 305 to attempt to register again.

On the other hand, if each sequence of symbols is associated with the same pattern of cells, then this pattern of cells may be considered to be the secret of user 305, and may be associated with the userid. Accordingly, at step 7 of message flow 350, authentication server 310 may instruct database 340 to store information related to the userid and the secret. For instance, the userid and/or secret may be stored in a plain text format, or in a cryptographically protected format. One possible cryptographically protected format would involve using a hash function, such as Message Digest 5 (MD5) or Secure Hash Function 1 (SHA1). MD5 is defined in IETF RFC 1321, which is incorporated by reference in its entirety herein. SHA1 is defined in IETF RFC 3174, which is also incorporated by reference in its entirety herein. Database 340 may store a plurality of such mappings between userids and secrets.

It should be understood that these embodiments are flexible enough to adapt to other standards or ecosystems of cryptography now known or developed in the future, and are not limited to just the hash functions discussed herein.

Regardless, at step 8 of message flow 350, authentication server 310 may indicate authentication success to user 305. For instance, authentication server 310 may inform user 305 that an account has been created.

Note that although user 305 may provide his or her userid to authentication server 310 during step 6 of message flow 350, user 305 may alternatively provide the userid during step 1 of message flow 300, or at some other point in the registration phase.

Furthermore, authentication server 310 may require that user 305 undertake multiple complete or partial registration phases, each registration phase potentially resulting in authentication server 310 determining a different userid and/or secret on behalf of user 305.

Figure 4A:
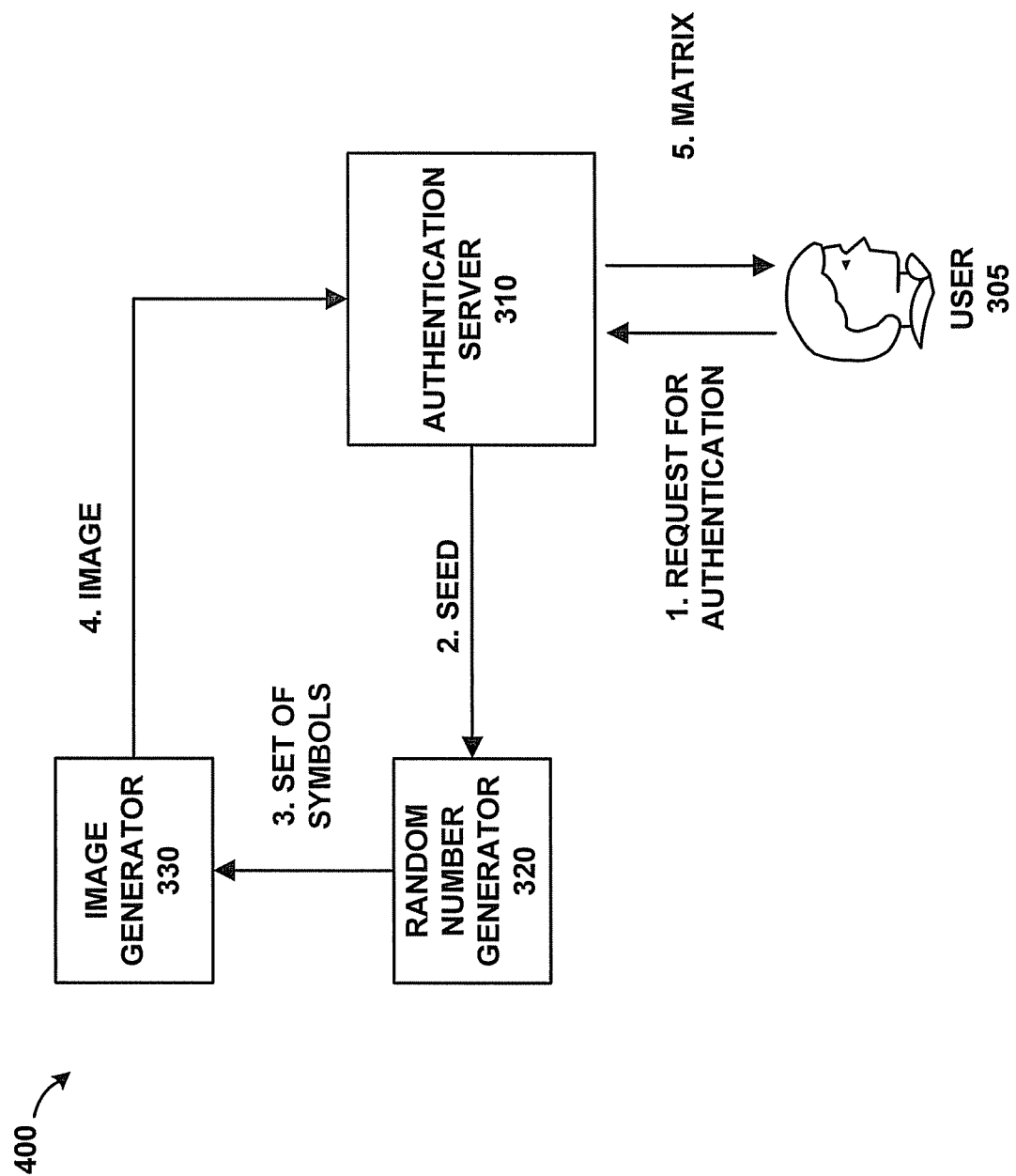
FIG. 4A is an authentication message flow in accordance with an example embodiment.
Figure 4B:
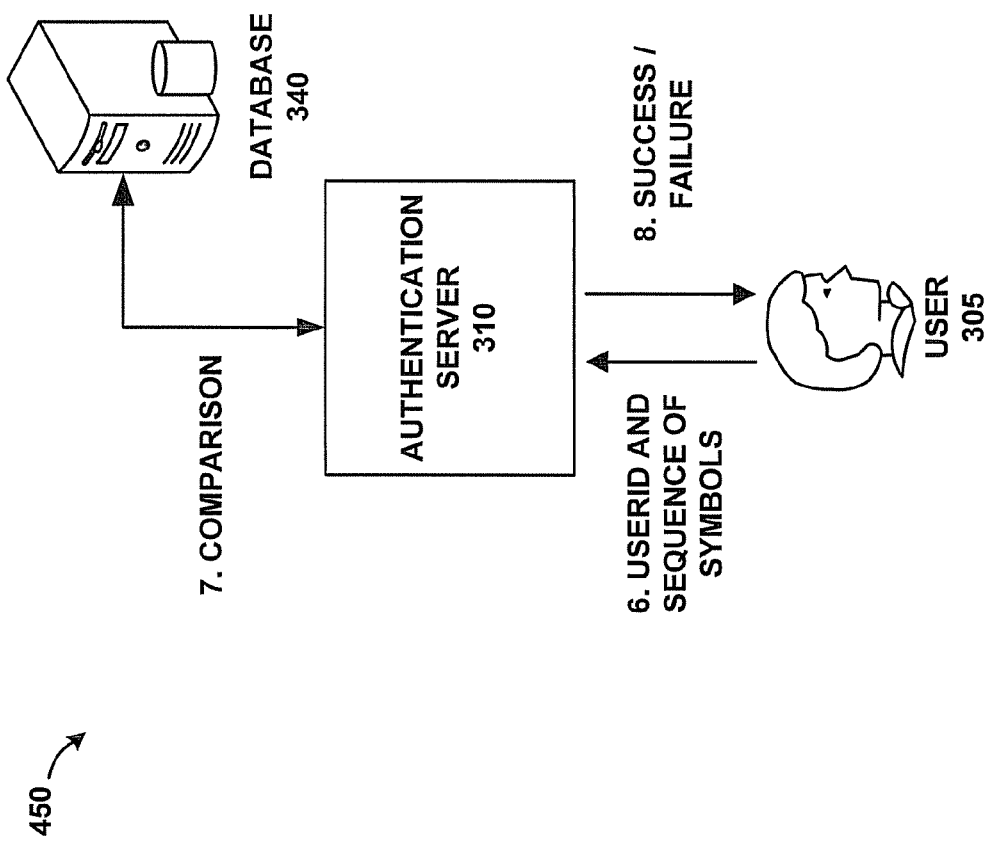
FIG. 4B is another authentication message flow in accordance with an example embodiment.

FIGS. 4A and 4B are block diagrams illustrating message flows 400 and 450 between various devices of a system that performs authentication of user 305. At step 1 of message flow 400, user 305 requests authentication from authentication server 310. Presumably, user 305 has an account with authentication server 310 prior to this step. At step 2 of message flow 400, authentication server 310 transmits a seed to random number generator 320. This seed may be a temporary seed used only for the current authentication phase of user 305. This seed may be generated based on a clock time maintained at authentication server 310, or through some other mechanism.

At step 3 of message flow 400, random number generator 320 transmits a set of symbols to image generator 330. These symbols may be generated randomly, based on the seed, in conjunction with random number generator 320. At step 4 of message flow 400, image generator 330 provides an image to authentication server 310. This image may be a matrix based on the set of symbols that image generator 330 received from random number generator 320. Then, at step 5 of message flow 400, authentication server 310 may provide depictions of these images, in the form of a matrix, to user 305.

Turning to FIG. 4B, at step 6 of message flow 450, user 305 may enter a userid and a sequence of symbols. User 305 may enter this sequence via an input device, such as a keyboard. Authentication server 310 may determine, from this sequence of symbols, a first sequence of cells in the matrix to which this sequence of symbols corresponds. Then, in conjunction with database 340, authentication server 310 may determine whether this first sequence of cells matches the sequence of cells represented by the secret associated with the entered userid.

For instance, database 340 may receive the userid, and look up the secret associated with the userid. After determining the secret, database 340 may provide a representation of this secret to authentication server 310. Authentication 310 may then represent the secret as a second sequence of cells, and, at step 7 of message flow 450, compare the first sequence of cells to the second sequence of cells. If the two sequences of cells are identical, then user 305 may be authenticated, and at step 8 of message flow 450 authentication server 310 may provide an indication of authentication success to user 305. However, if the two sequences of cells are not identical, authentication server 310 may provide an indication of authentication failure to user 305.

If user 305 is successfully authenticated with authentication server 310, user 305 may be granted access to resources associated with authentication server 310. These resources may include, but are not limited to, network resources (such as a private network), computing resources (such as a particular device on a network), information resources (such as data accessible by a web server), and so on. Alternatively, authentication server 310 may require that user 305 undertake multiple complete or partial authentication phases, each authentication phase potentially requiring user 305 to authenticate himself or herself with a different userid and/or secret.

On the other hand, if user 305 is not successfully authenticated by authentication server 310, authentication server 310 may not allow user 305 access to these, or any other, resources. However, authentication server 310 may allow user 305 to attempt the authentication again. Accordingly, part or all of the procedure illustrated by FIGS. 4A and 4B may be repeated one or more times.

It should be understood that FIGS. 3A, 3B, 4A and 4B are illustrative in nature. Accordingly, the devices depicted in these figures may be physically or logically combined with one another without departing from the spirit of the invention. For example, authentication server 310 may be combined with database 340. Furthermore, any of these devices may be physically or logically divided or separated, also without departing from the spirit of the invention. For example, authentication server 310 may be distributed over multiple physical devices. Thus, the embodiments described herein may take the form of, or take place on, more or fewer devices.

Additionally, any of these devices, as well as the user, may be communicatively coupled with any other of these devices by a communication network. The communication network may be, for example, the Internet, a wireless network, a private network, or some other form of network. In one embodiment, the communication network operates according to the Internet Protocol (IP). However, other embodiments in which the communication network does not use IP are possible.

Moreover, user 305 need not be a human user. For instance, user 305 may be a computing device operating in accordance with these embodiments to perform the registration phase or authentication phase as described herein.

Figure 5:
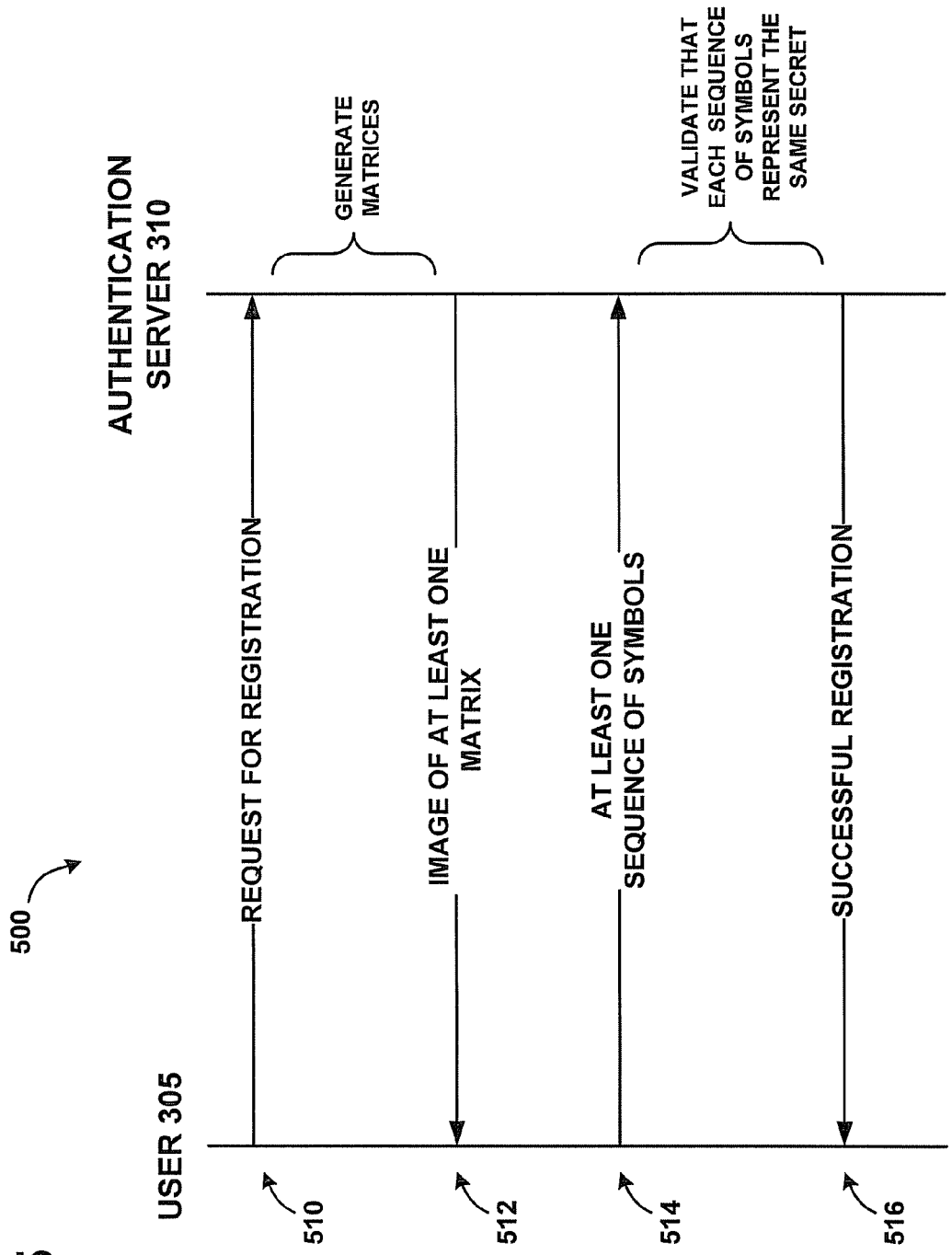
FIG. 5 is a client-server registration phase message flow in accordance with an example embodiment.
Figure 6:
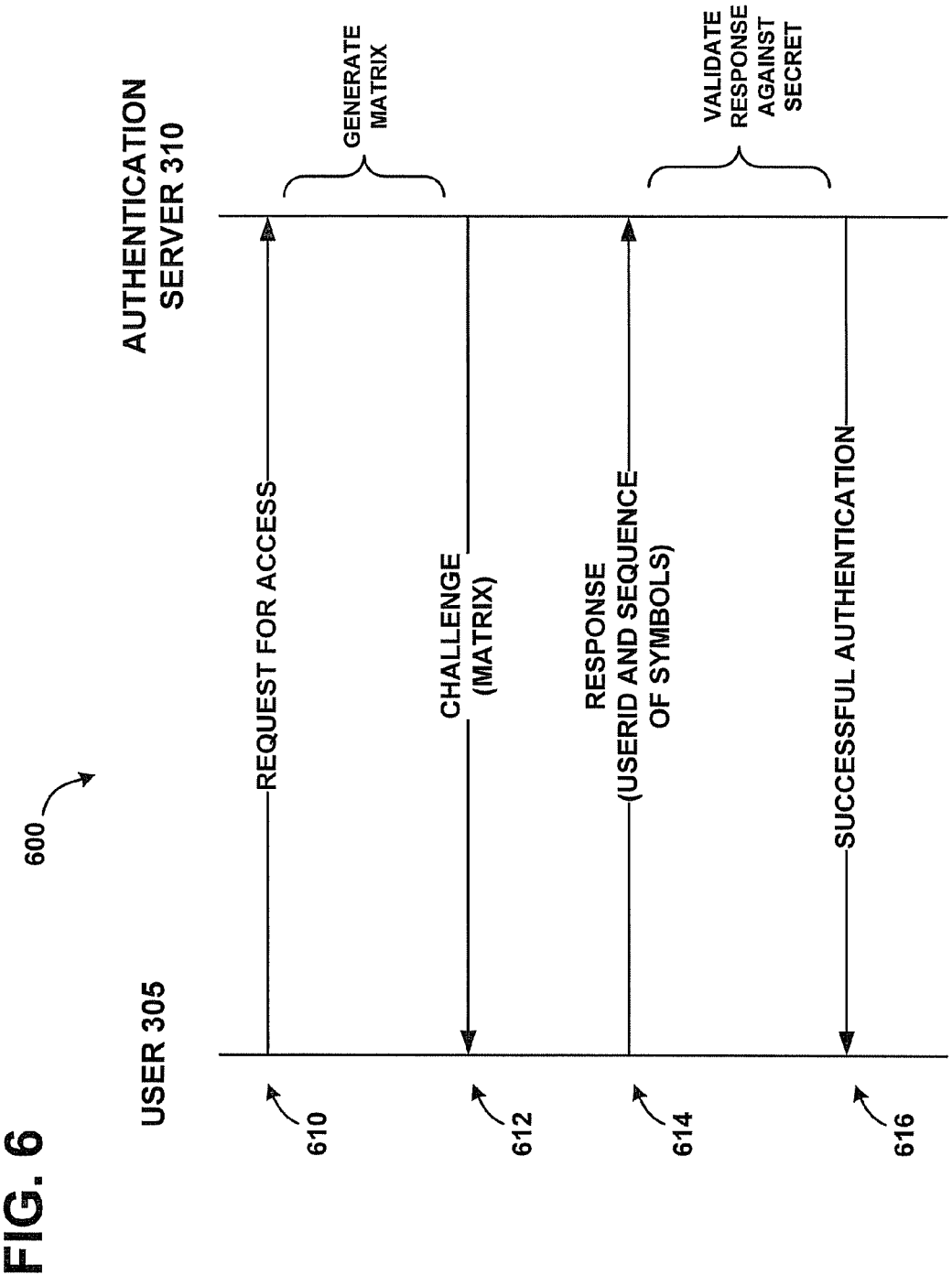
FIG. 6 is a client-server authentication phase message flow in accordance with an example embodiment.

FIGS. 5 and 6 illustrate the registration phase and authentication phase, respectively, from the perspective of communication between user 305 and authentication server 310. This communication may take place across a network, such as the Internet.

In FIG. 5, call flow 500 illustrates the registration phase. At step 510, user 305 requests registration with authentication server 310. Presumably, but not necessarily, user 305 has not yet established a userid and/or secret with authentication server 310. Accordingly, authentication server 310 generates one or more matrices, and at step 512, may transmit these matrices to user 305. At step 514, user 305 may transmit a response containing at least one sequence of symbols to authentication server 310. Authentication server 310 may then validate that, if it received more than one sequence of symbols, each of these sequences of symbols represent the same secret. If this validation succeeds, then authentication server 310 may transmit an indication of successful registration to user 305.

In FIG. 6, call flow 600 illustrates the authentication phase. At step 610, user 305 may transmit a request for access to authentication server 310. Presumably, user 305 has already registered for an account with authentication server 310, and authentication server 310 maintains an association between a userid and secret for this account. In response to the request, authentication server 310 may generate a matrix, and at step 612 may transmit a challenge to user 305 containing a representation of this matrix. For instance, the representation of the matrix may be an image viewable by user 305. In any case, at step 614, user 305 may transmit a response containing the userid and a sequence of symbols to authentication server 310. Then, authentication server 310 may validate the sequence of symbols against the secret associated with the userid. If the sequence of symbols represents a sequence of cells that matches the sequence of cells represented by the secret, then at step 616, authentication server may transmit an indication of authentication success to user 305. Authentication server 310 may also then allow user 305 access to one or more resources associated with authentication server 310.

However, if user 305 is not successfully authenticated by authentication server 310, authentication server 310 may not allow user 305 access to these, or any other, resources. Additionally, authentication server 310 may allow user 305 to attempt the authentication again. Accordingly, part or all of the procedure illustrated by FIG. 6 may be repeated one or more times.

In an alternative embodiment, part or all of the response that user 305 transmits to authentication server 310 may be cryptographically protected. For instance, at step 612, authentication server may transmit, in the challenge, a long string of random bits (for example, 256 randomly-generated bits). Then, prior to step 614, user 305, may calculate a hash function of the string of random bits and the sequence of symbols. For instance, user 305 may use the string of random bits and the sequence of symbols as parameters to an SHA1 hash function. Then, at step 614, user 305 may transmit the output of the hash function in the response. When authentication server 310 receives this hash function output, it can also calculate an SHA1 hash function of the string of random bits and the sequence of symbols represented by the secret associated with the userid. If the output of both hash functions match, then authentication server 310 has validated the response of user 305 against the secret. This procedure is similar to that of the Challenge-Handshake Authentication Protocol (CHAP), defined in IETF RFC 1994, which is incorporated by reference in its entirety herein.

Alternatively, the challenge transmitted at step 612 may be modulated with a noise library. In this way, the challenge may be distorted to prevent a machine from computationally determining or otherwise comprehending the representation being transmitted, while a user may still be able to properly perceive the challenge. These noise libraries can be implemented in hardware (such as a digital signal processor) or software.

Figure 7:
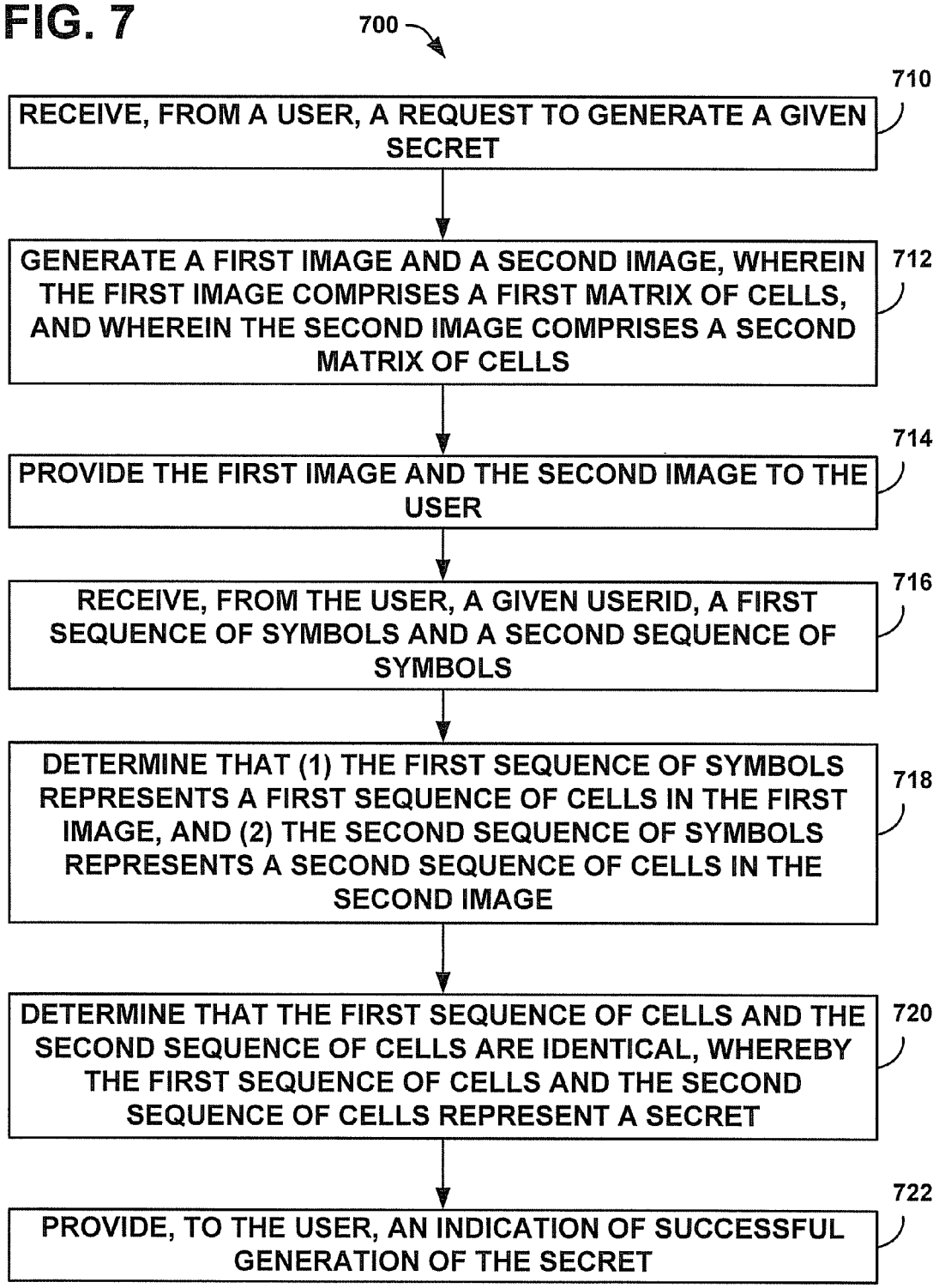
FIG. 7 is a flow chart of a registration phase in accordance with an example embodiment.

In FIG. 7, flow chart 700 illustrates a method for registering a user at an authentication server. At step 710, a request to generate a given secret is received from a user. This request may take the form of a request for registration. At step 712, a first image comprising a first matrix of cells is generated, and a second image comprising a second matrix of cells is also generated.

The first matrix and the second matrix may be generated randomly. For example, the authentication server may generate a first seed value and a second seed value. The authentication server may then use the first seed to randomly generate a first set of symbols to place in the cells of the first matrix, and use the second seed to randomly generate a second set of symbols to place in the cells of the second matrix.

Regardless of how the matrices of cells are generated, at step 714, the first image and the second image may be provided to the user. At step 716, a userid, a first sequence of symbols and a second sequence of symbols are received from the user. At step 718, it is determined that (1) the first sequence of symbols represents a first sequence of cells in the first image, and (2) the second sequence of symbols represents a second sequence of cells in the second image. At step 720, it is determined that the first sequence of cells and the second sequence of cells are identical. Accordingly, the authentication server may save a representation of these sequences of cells as the given secret. At step 722, the user is provided with an indication of successful generation of the given secret.

Figure 8:
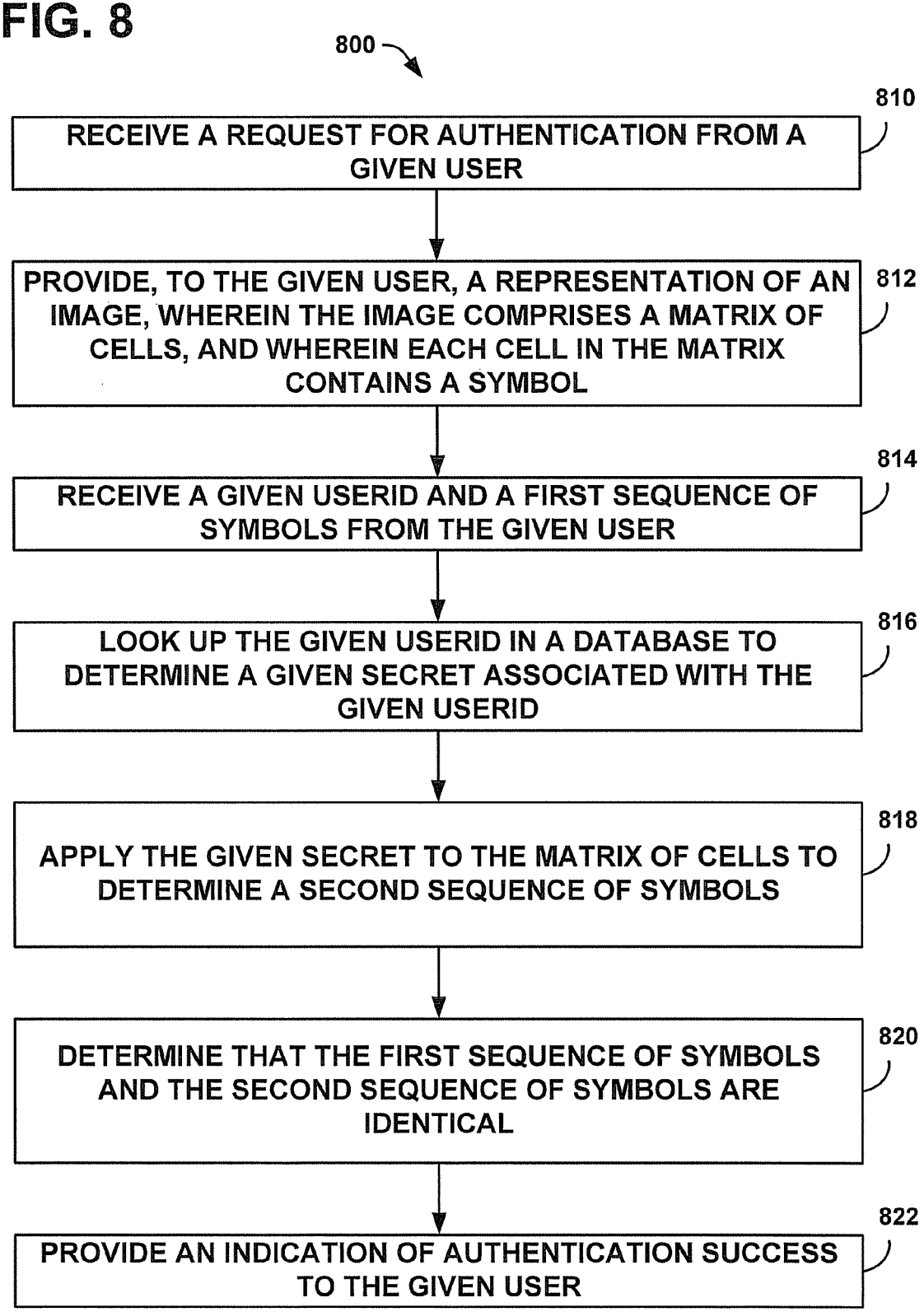
FIG. 8 is a flow chart of an authentication phase in accordance with an example embodiment.

In FIG. 8, flow chart 800 illustrates a method for authenticating a user at an authentication server. At step 810, a request for authentication from a given user may be received. At step 812, the given user may be provided with a representation of an image, where the image may comprise a matrix of cells, and where each cell in the matrix may contain a symbol. At step 814, a given userid and a first sequence of symbols may be received from the given user. At step 816, the given userid may be looked up in a database that associated userids with secrets to determine a given secret that may be associated with the given userid. At step 818, the given secret may be applied to the matrix of cells to determine a second sequence of symbols. At step 820, it may be determined that the first sequence of symbols is identical to the second sequence of symbols, and at step 822, the authentication server may provide an indication of authentication success to the user. After step 820, the authentication server may grant the user access to at least one resource associated with the authentication server.

It should be understood that the methods, procedures, operations, devices, and systems illustrated in FIGS. 5, 6, 7, and 8 may be modified without departing from the spirit of the invention. For example, these methods, procedures, operations, devices, and systems may comprise more or fewer steps or components than appear herein, and these steps or components may be combined with one another, in part or in whole.

Figure 9:
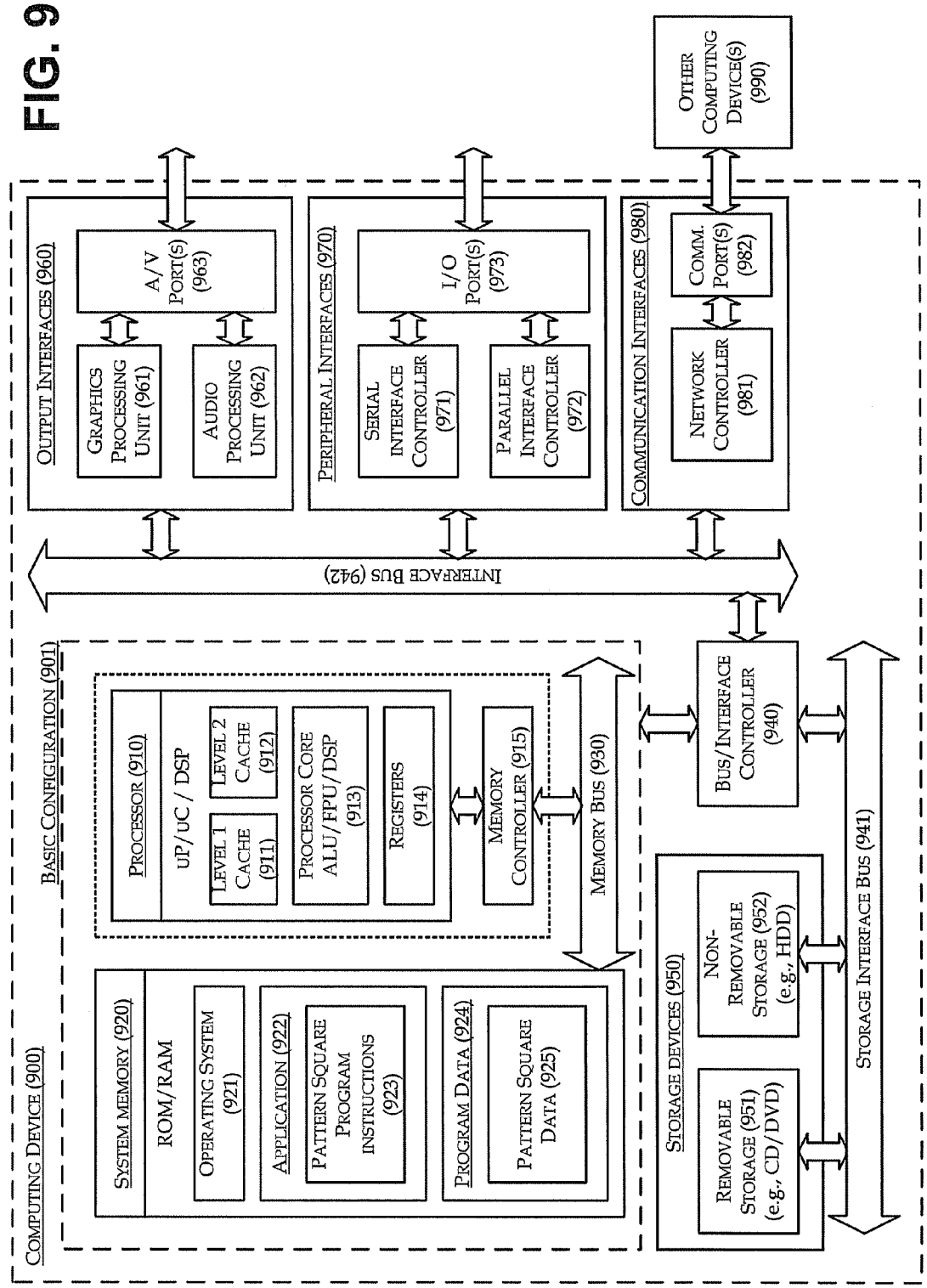
FIG. 9 is schematic diagram of an authentication server in accordance with an example embodiment.

FIG. 9 is a block diagram illustrating an example computing device 900 that is arranged for performing as an authentication server in accordance with the present disclosure. In a very basic configuration 901, computing device 900 typically includes one or more processors 910 and system memory 920. A memory bus 930 can be used for communicating between the processor 910 and the system memory 920.

Depending on the desired configuration, processor 910 can be of any type including but not limited to a microprocessor (µP), a microcontroller (µC), a digital signal processor (DSP), or any combination thereof. Processor 910 can include one more levels of caching, such as a level one cache 911 and a level two cache 912, a processor core 913, and registers 914. The processor core 913 can include an arithmetic logic unit (ALU), a floating point unit (FPU), a digital signal processing core (DSP Core), or any combination thereof. A memory controller 915 can also be used with the processor 910, or in some implementations the memory controller 915 can be an internal part of the processor 910.

Depending on the desired configuration, the system memory 920 can be of any type including but not limited to volatile memory (such as RAM), non-volatile memory (such as ROM, flash memory, etc.) or any combination thereof. System memory 920 typically includes an operating system 921, one or more applications 922, and program data 924. Application 922 includes program instructions 923 that are capable of carrying out one or more of the methods, processes, and/or functions described herein.

Program data 924 includes data 925 that may be useful for carrying out one or more of the methods, processes, and/or functions described herein. In some example embodiments, application 922 can be arranged to operate with program data 924 on an operating system 921 such that computing device 900 perform at least some of the authentication server functions described herein. This described basic configuration is illustrated in FIG. 9 by those components within dashed line 901.

Computing device 900 can have additional features or functionality, and additional interfaces to facilitate communication between the basic configuration 901 and any required devices and interfaces. For example, a bus/interface controller 940 can be used to facilitate communication between the basic configuration 901 and one or more data storage devices 950 via a storage interface bus 941. The data storage devices 950 can be removable storage devices 951, non-removable storage devices 952, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 920, removable storage 951 and non-removable storage 952 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of device 900.

Computing device 900 can also include an interface bus 942 for facilitating communication from various interface devices (e.g., output interfaces, peripheral interfaces, and communication interfaces) to the basic configuration 901 via the bus/interface controller 940. Example output interfaces 960 include a graphics processing unit 961 and an audio processing unit 962, which can be configured to communicate to various external devices such as a display or speakers via one or more ANV ports 963. Example peripheral interfaces 960 include a serial interface controller 971 or a parallel interface controller 972, which can be configured to communicate with external devices such as input devices (e.g., keyboard, mouse, pen, voice input device, touch input device, etc.) or other peripheral devices (e.g., printer, scanner, etc.) via one or more I/O ports 973. An example communication interface 980 includes a network controller 981, which can be arranged to facilitate communication with one or more other computing devices 990 over a network communication via one or more communication ports 982. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 900 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 can also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for an authentication server to generate a given secret, the method comprising:
   the authentication server receiving a request to generate the given secret;
   the authentication server generating a first image, wherein the first image comprises a first matrix of cells, wherein each cell in the first matrix contains exactly one symbol, and wherein each symbol of a first set of symbols appears in exactly one cell in the first matrix;
   the authentication server generating a second image, wherein the second image comprises a second matrix of cells, wherein each cell in the second matrix contains exactly one symbol, and wherein each symbol of a second set of symbols appears in exactly one cell in the second matrix;
   the authentication server providing the first image and the second image in a single step;
   after providing the first image and the second image, the authentication server receiving a given userid, a first sequence of symbols and a second sequence of symbols;
   the authentication server determining that (1) the first sequence of symbols represents a first sequence of cells in the first image, and (2) the second sequence of symbols represents a second sequence of cells in the second image;
   the authentication server determining that the first sequence of cells and the second sequence of cells are identical, whereby the first sequence of cells and the second sequence of cells represent the given secret; and
   the authentication server providing an indication of successful generation of the given secret.

2. The method of claim 1, further comprising:
   the authentication server generating a first seed value and a second seed value;
   the authentication server using the first seed to randomly generate the first set of symbols; and
   the authentication server using the second seed to randomly generate the second set of symbols.

3. The method of claim 1, wherein the first matrix is an n×n matrix and the second matrix is an n×n matrix.

4. The method of claim 1, wherein the symbols contained in the cells of each of the first matrix and the second matrix are chosen from a dictionary of ASCII character symbols.

5. The method of claim 1, wherein the authentication server is communicatively coupled to a network, and wherein (1) receiving the request to generate the given secret comprises receiving the request to generate the secret via the network, (2) providing the first image and the second image comprises providing the first image and the second image via the network, (3) receiving the userid, the first sequence of symbols and the second sequence of symbols comprises receiving the userid, the first sequence of symbols and the second sequence of symbols via the network, and (4) providing the indication of successful generation of the given secret comprises providing the indication of successful generation of the given secret via the network.

6. The method of claim 1, further comprising:
   the authentication server creating, in a database, a mapping between the given userid and the given secret.

7. The method of claim 6, wherein the database includes a plurality of mappings between userids and secrets.

* * * * *